United States Patent
Scholz et al.

[15] 3,652,055
[45] Mar. 28, 1972

[54] VALVE CONSTRUCTION

[72] Inventors: Paul W. Scholz, Jeannette; Charles C. Czuszak, Greensburg, both of Pa.

[73] Assignee: Carrier Corporation, Syracuse, N.Y.

[22] Filed: Nov. 24, 1970

[21] Appl. No.: 92,393

[52] U.S. Cl. ................................................251/67
[51] Int. Cl. ................................................F16k 31/44
[58] Field of Search ..................251/66, 67, 74, 286; 137/57

[56] References Cited

UNITED STATES PATENTS 1,539,305   5/1925   Dunne.......................................251/67
3,461,893   8/1969   Czuszak..................................137/57 X Primary Examiner—Henry T. Klinksiek
Attorney—Harry G. Martin, Jr. and J. Raymond Curtin

[57] ABSTRACT

In a type of combined throttle and trip valve structure, the valve stem has threaded engagement with half nuts; the valve is opened by manual rotation of the stem. Operation of the trip mechanism effects lateral movement of the half nuts out of engagement with the stem and the valve is moved into closed position by spring means. The invention has to do with mechanism to automatically limit the extent of movement of the valve from the valve seat to prevent any jamming of the valve assembly, and to permit the valve to be closed by the spring when the trip mechanism is actuated.

5 Claims, 5 Drawing Figures

PATENTED MAR 28 1972  3,652,055
INVENTOR.
PAUL W. SCHOLZ
CHARLES C. CZUSZAK
BY
ATTORNEY
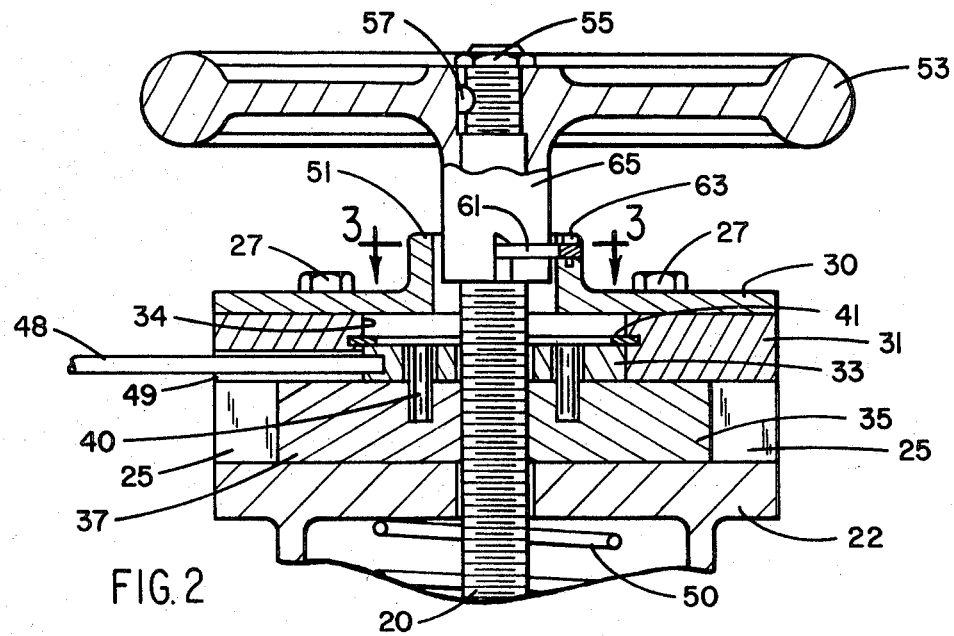
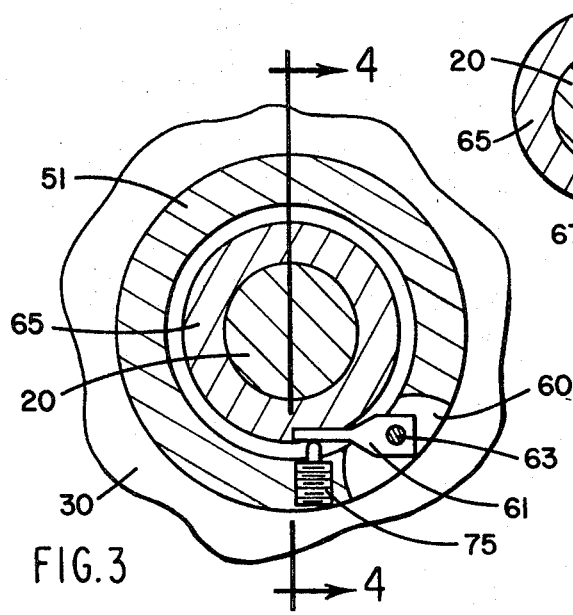
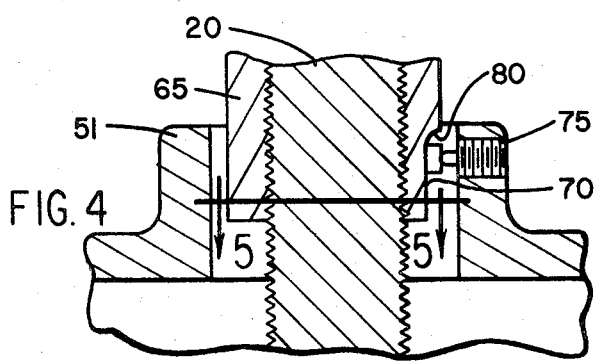
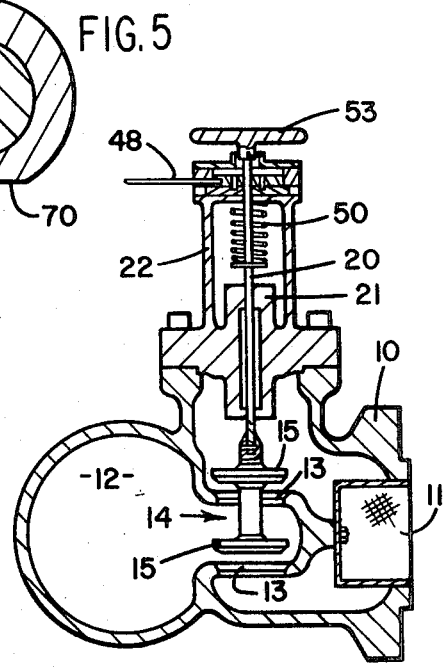

VALVE CONSTRUCTION

BACKGROUND OF THE INVENTION

In a conventional combination throttle and trip valve, the valve is opened by manual rotation of the valve stem which is threaded in a pair of half nuts. These valves are used in conjunction with trip mechanism which in an emergency situation, such as the overspeeding of a turbine, moves the half nuts out of engagement with the stem, whereupon the valve and the stem are moved rapidly inward by spring means to move the valve in closed position with the seat. It is possible for the operator to exert such force on the valve stem when the stem and valve are moved in their outermost position to cause the valve mechanism to be jammed with such tightness that the spring means cannot move the valve to closed position when the trip mechanism is actuated.

SUMMARY OF THE INVENTION

This invention has to do with mechanism involving a particularly economical structure which may be readily incorporated with conventional valves of this type, and which functions automatically to restrain manual rotation of the valve stem before the valve mechanism reaches a jamming position and which, however, will readily permit the valve to be tripped to closed position.

BRIEF DESCRIPTION OF THE DRAWINGS

FIG. 1 is a vertical sectional view of a conventional throttle and trip valve;

FIG. 2 is an enlarged view of the top portion of the view shown in FIG. 1;

FIG. 3 is a view taken on a line corresponding to line 3—3, FIG. 2;

FIG. 4 is a view taken on a line corresponding to line 4—4, FIG. 3; and

FIG. 5 is a view taken on a line corresponding to line 5—5, FIG. 4.

DESCRIPTION OF THE PREFERRED EMBODIMENT

The valve structure includes a body having a base portion 10 with inlet and outlet openings 11,12 connected by a passage extending through seats 13. The valve 14 is of the spool type having axially spaced apart discoidal portions 15 movable into and out of engagement with the seats 13. The valve 14 is fixed to the inner end of a valve stem 20, the inner portion of which is slidably mounted in a guide structure 21 formed in the bonnet 22.

A diametrical slot 25 is formed in the upper surface of bonnet 22. The slot forms a space or track within which half nuts, to be hereinafter described, may slide. Fastened to the top of the bonnet structure 22 as by screws 27 are disc 30 and an annular member 31. A circular member 33 having a central bore surrounding the stem 20 in spaced relation thereto is mounted in the bore 34 of the annular member 31, for rotation about the axis of stem 20. The member 33 is positioned on half nuts 35,37, mounted for sliding movement in the diametrically extending slot 25. The half nuts may be considered as threaded restraint means in view of its selective engagement with stem 20 as will be more fully understood. A pin 40 extends upwardly from each half nut 35,37, into chordally disposed slots formed in the member 33. The member 33 is retained in the bore 34 of the annular member 31 by a snap ring 41, the peripheral margin of which extends into a circumferentially extending slot formed in the bore 34.

An actuating rod 48 is fixedly secured to the annular member 33 and extends radially outwardly therefrom through a slot 49 formed in the annular member 31. The actuator 48 is connected to the trip mechanism associated with the device with which the valve is used, such as a steam turbine. If the speed of the turbine exceeds a predetermined value, the trip mechanism effects oscillation of the member 33 and through the instrumentality of the pins 40, the half nut sections 35,37 are moved laterally in the slot 25 out of engagement with the valve stem 20, whereupon the stem being free of the threaded restraint provided by the half nuts is moved downwardly as by spring 50, FIG. 1. This mechanism, with the exception of the disc 30, is described in detail in U.S. Pat. No. 3,461,893, Aug. 19, 1969, to C. C. Czuszak.

As previously stated, this invention is directed to an arrangement to limit outward movement of the valve stem 20 and the valve 14 carried thereby, by manual rotation of the stem in the half nuts 35,37.

As clearly illustrated in the drawings, the valve stem 20 extends outwardly through the half nuts 35,37, through the disc 33, and through a cylindrical flange 51 extending upwardly from the disc 30. A hand wheel 53 is fixed to the outer end of the stem by being clamped by nut 55 against a shoulder formed on the stem and by a key 57.

A detent is mounted on the valve body structure for movement into interlocking engagement with the valve stem, when the valve is moved by manual rotation of the hand wheel 53 a predetermined distance from the valve seats 13.

In the embodiment shown, the cylindrical flange 51 is formed with a recess 60 in which a detent 61 is pivotally mounted by pin 63. The free end of the detent extends inwardly toward the stem 20. Inasmuch as the hub 65 of hand wheel 53 forms a part of the stem 20 by being fixedly attached thereto, the hub 65 is formed in proximity to the inner end thereof with a detent engaging portion. The hand wheel hub 65 is formed on its periphery with a recess in the form of a notch having a radially extending wall 67 merging with a wall 70 extending at right angles to the wall 67 (see FIG. 5). This notch formation extends outwardly in an axial direction from the inner end of the hub 65.

When the valve stem has been turned outwardly in the half nuts to move the valve 14 to open position, the notch formation in the hand wheel hub will be positioned in registration with the detent 61. The detent 61 is yieldingly urged toward the stem 20 by a spring loaded ball plunger device 75 mounted in the flange 51. Accordingly, when the stem has been threaded outwardly to position the notch in registration with the detent 61, the latter is moved about pivot 63 against the wall 70 of the notch, the end surface of the detent engaging the wall 67 of the notch. Accordingly, the hand wheel cannot be turned further in the direction threading the stem 20 outwardly. With this engagement by the detent 61, the valve structure 14 is positioned below the guide structure 21, whereby the valve does not become jammed against the guide structure, and there is no tightening action between the stem and the half nuts 35,37.

Referring to FIG. 4, the upper end of the notch wall 70 is curved outwardly as at 80. Accordingly, if the actuator 48 is operated to effect disengagement of the half nuts 35,37 from the stem 20, the stem is moved downwardly by spring 50. The curved end surface 80 at the upper end of the notch wall 70 serves as a cam to cam the detent 61 out of engagement with the notch in the hand wheel hub 65, permitting complete closing movement of the valve 14 against the seats 13.

It is apparent the wall 67 of the notch serves as a ratchet wheel tooth and the detent 61 functions as a pawl which upon engaging the wall 67, as shown in FIG. 3, prevents rotation of the valve stem in the valve opening direction. However, the ratchet and pawl arrangement permits the stem to be rotated in reverse direction or closing the valve. In the latter case, the detent 61 simply ratchets over the wall 67 of the notch.

We claim:

1. A combination throttle and trip valve structure including a body provided with a valve seat, selectively operable threaded restraint means mounted in the body, a valve stem having threaded engagement with said means and extending outwardly from said body, a valve attached to the inner end of said stem and being movable upon manual rotation of said stem in said means into and out of engagement with said seat, spring means for moving said valve into closed seat engaging position upon movement of said restraint means out of engagement with said stem; of mechanism for limiting the extent of movement of said valve from said seat by manual rotation of said stem in one direction, said mechanism comprising a detent mounted on said body and being movable into engagement with said stem upon movement of said stem and valve a predetermined distance from said seat, said detent being operable upon such engagement with said stem to restrain further rotation thereof in said one direction, cam means operable upon axial movement of said stem and valve toward said seat by said spring means for moving said detent out of engagement with said stem.

2. A combination throttle and trip valve structure as set forth in claim 1 wherein said cam means is formed on said valve stem.

3. A combination throttle and trip valve structure as set forth in claim 1 and including means yieldingly urging said detent into engagement with said valve stem upon said valve being moved said predetermined distance from said seat.

4. A combination throttle and trip valve structure including a body provided with a valve seat, a pair of half nuts mounted in the body, a valve stem having threaded engagement with said half nuts and extending outwardly from said body, a valve attached to the inner end of said stem and being movable upon manual rotation of said stem in said nuts into and out of engagement with said seat, spring means for moving said valve into closed seat engaging position upon movement of said half nuts out of engagement with said stem; of mechanism for limiting the extent of movement of said valve from said seat by manual rotation of said stem in one direction, said mechanism comprising stop means fixed to said stem, a detent mounted on said body and being movable into engagement with said stop means upon movement of said stem and valve a predetermined distance from said seat, said detent being operable upon such engagement with said stop means to restrain further rotation of said stem in said one direction, said stem being provided with a cam surface, cam means operable, upon movement of said stem and valve toward said seat by said spring means, for moving said detent out of engagement with said stop means.

5. A combination throttle and trip valve structure as set forth in claim 4 wherein said stop means consists of a ratchet tooth and said detent is yieldingly urged into engagement with said ratchet to the upon said valve being moved a predetermined distance from said seat.

* * * * *